United States Patent
Hiraga et al.

(10) Patent No.: US 8,224,116 B2
(45) Date of Patent: Jul. 17, 2012

(54) IMAGE PROCESSING METHOD AND IMAGING APPARATUS

(75) Inventors: Masaki Hiraga, Tokyo (JP); Kensuke Habuka, Tokyo (JP); Takeshi Miura, Tokyo (JP)

(73) Assignee: Morpho, Inc., Tokyo (JP)

( * ) Notice: Subject to any disclaimer, the term of this patent is extended or adjusted under 35 U.S.C. 154(b) by 399 days.

(21) Appl. No.: 12/655,320

(22) Filed: Dec. 29, 2009

(65) Prior Publication Data

US 2010/0183240 A1 Jul. 22, 2010

(30) Foreign Application Priority Data

Dec. 31, 2008 (JP) ................................. 2008-335867

(51) Int. Cl.
*G06K 9/40* (2006.01)
(52) U.S. Cl. ......... 382/275; 382/260; 382/299; 382/300
(58) Field of Classification Search .................. 382/199, 382/260, 264, 275, 298, 299, 300
See application file for complete search history.

(56) References Cited

U.S. PATENT DOCUMENTS

| 5,845,017 A * | 12/1998 | Keyes ........................... 382/261 |
| 6,907,144 B1 * | 6/2005 | Gindele ........................ 382/275 |
| 8,059,910 B2 * | 11/2011 | Ishiga ........................... 382/263 |

FOREIGN PATENT DOCUMENTS

JP 2006-180268 7/2006

* cited by examiner

*Primary Examiner* — Phuoc Tran
(74) *Attorney, Agent, or Firm* — Muramatsu & Associates

(57) ABSTRACT

An image processing method for reducing noise of an image to be filtered; the method includes a step of creating shrunken image of shrinking ratio r×r (where r is a natural number) by averaging the pixel values for each pixel in a block for every r pixels, a step of obtaining the pixel value in the shrunken image that correspond to the focus pixel in the source image by performing linear interpolation from the shrunken image pixels, a step of determining the noise reduction filter from the focus pixel and reference pixel in the shrunken image, and a step of computing the compensated pixel value of the focus pixel in the source image by weighted sum of each pixel value applying the filter to the focus pixel in the source image and the corresponding shrunken pixel.

5 Claims, 15 Drawing Sheets

FIG. 3

$EF_0 : (0°)$
$$\begin{bmatrix} 0 & 4 & 0 & -4 & 0 \\ 0 & 4 & 0 & -4 & 0 \\ 0 & 4 & 0 & -4 & 0 \\ 0 & 4 & 0 & -4 & 0 \\ 0 & 4 & 0 & -4 & 0 \end{bmatrix}$$

$EF_1 : (15°)$
$$\begin{bmatrix} 0 & 0 & 4 & 0 & -4 \\ 0 & 4 & 0 & -4 & 0 \\ 0 & 4 & 0 & -4 & 0 \\ 0 & 4 & 0 & -4 & 0 \\ 4 & 0 & -4 & 0 & 0 \end{bmatrix}$$

$EF_2 : (30°)$
$$\begin{bmatrix} 0 & 0 & 4 & 0 & -4 \\ 0 & 0 & 4 & 0 & -4 \\ 0 & 4 & 0 & -4 & 0 \\ 4 & 0 & -4 & 0 & 0 \\ 4 & 0 & -4 & 0 & 0 \end{bmatrix}$$

$EF_3 : (45°)$
$$\begin{bmatrix} 0 & 0 & 0 & 5 & 0 \\ 0 & 0 & 5 & 0 & -5 \\ 0 & 5 & 0 & -5 & 0 \\ 5 & 0 & -5 & 0 & 0 \\ 0 & -5 & 0 & 0 & 0 \end{bmatrix}$$

$EF_4 : (60°)$
$$\begin{bmatrix} 0 & 0 & 0 & 4 & 4 \\ 0 & 0 & 4 & 0 & 0 \\ 4 & 4 & 0 & -4 & -4 \\ 0 & 0 & -4 & 0 & 0 \\ -4 & -4 & 0 & 0 & 0 \end{bmatrix}$$

$EF_5 : (75°)$
$$\begin{bmatrix} 0 & 0 & 0 & 0 & 4 \\ 0 & 4 & 4 & 4 & 0 \\ 4 & 0 & 0 & 0 & -4 \\ 0 & -4 & -4 & -4 & 0 \\ -4 & 0 & 0 & 0 & 0 \end{bmatrix}$$

$EF_6 : (90°)$
$$\begin{bmatrix} 0 & 0 & 0 & 0 & 0 \\ 4 & 4 & 4 & 4 & 4 \\ 0 & 0 & 0 & 0 & 0 \\ -4 & -4 & -4 & -4 & -4 \\ 0 & 0 & 0 & 0 & 0 \end{bmatrix}$$

$EF_7 : (105°)$
$$\begin{bmatrix} 4 & 0 & 0 & 0 & 0 \\ 0 & 4 & 4 & 4 & 0 \\ -4 & 0 & 0 & 0 & 4 \\ 0 & -4 & -4 & -4 & 0 \\ 0 & 0 & 0 & 0 & -4 \end{bmatrix}$$

$EF_8 : (120°)$
$$\begin{bmatrix} 4 & 4 & 0 & 0 & 0 \\ 0 & 0 & 4 & 0 & 0 \\ -4 & -4 & 0 & 4 & 4 \\ 0 & 0 & -4 & 0 & 0 \\ 0 & 0 & 0 & -4 & -4 \end{bmatrix}$$

$EF_9 : (135°)$
$$\begin{bmatrix} 0 & 5 & 0 & 0 & 0 \\ -5 & 0 & 5 & 0 & 0 \\ 0 & -5 & 0 & 5 & 0 \\ 0 & 0 & -5 & 0 & 5 \\ 0 & 0 & 0 & -5 & 0 \end{bmatrix}$$

$EF_{10} : (150°)$
$$\begin{bmatrix} -4 & 0 & 4 & 0 & 0 \\ -4 & 0 & 4 & 0 & 0 \\ 0 & -4 & 0 & 4 & 0 \\ 0 & 0 & -4 & 0 & 4 \\ 0 & 0 & -4 & 0 & 4 \end{bmatrix}$$

$EF_{11} : (165°)$
$$\begin{bmatrix} -4 & 0 & 4 & 0 & 0 \\ 0 & -4 & 0 & 4 & 0 \\ 0 & -4 & 0 & 4 & 0 \\ 0 & -4 & 0 & 4 & 0 \\ 0 & 0 & -4 & 0 & 4 \end{bmatrix}$$

FIG. 4

*DistanceTable₀* (0°)

| 112 | 96 | 80 | 64 | 48 | 32 | 16 | 00 | 16 | 32 | 48 | 64 | 80 | 96 | 112 |
|-----|----|----|----|----|----|----|----|----|----|----|----|----|----|-----|
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |
| 112 | 96 | 80 | 64 | 48 | 32 | 16 | 00 | 16 | 32 | 48 | 64 | 80 | 96 | 112 |

*DistanceTable₁* (15°)

| 126 | 111 | 96 | 81 | 66 | 51 | 35 | 20 | 05 | 10 | 25 | 40 | 56 | 71 | 86 |
|-----|-----|----|----|----|----|----|----|----|----|----|----|----|----|----|
| 121 | 106 | 91 | 76 | 61 | 46 | 30 | 15 | 00 | 15 | 30 | 46 | 61 | 76 | 91 |
| 116 | 101 | 86 | 71 | 56 | 40 | 25 | 10 | 05 | 20 | 35 | 51 | 66 | 81 | 96 |
| 111 | 96 | 81 | 66 | 51 | 35 | 20 | 05 | 10 | 25 | 40 | 56 | 71 | 86 | 101 |
| 106 | 91 | 76 | 61 | 46 | 30 | 15 | 00 | 15 | 30 | 46 | 61 | 76 | 91 | 106 |
| 101 | 86 | 71 | 56 | 40 | 25 | 10 | 05 | 20 | 35 | 51 | 66 | 81 | 96 | 111 |
| 96 | 81 | 66 | 51 | 35 | 20 | 05 | 10 | 25 | 40 | 56 | 71 | 86 | 101 | 116 |
| 91 | 76 | 61 | 46 | 30 | 15 | 00 | 15 | 30 | 46 | 61 | 76 | 91 | 106 | 121 |
| 86 | 71 | 56 | 40 | 25 | 10 | 05 | 20 | 35 | 51 | 66 | 81 | 96 | 111 | 126 |

⋮

*DistanceTable₆* (90°)

| 64 | 64 | 64 | 64 | 64 | 64 | 64 | 64 | 64 | 64 | 64 | 64 | 64 | 64 | 64 |
|----|----|----|----|----|----|----|----|----|----|----|----|----|----|----|
| 48 | 48 | 48 | 48 | 48 | 48 | 48 | 48 | 48 | 48 | 48 | 48 | 48 | 48 | 48 |
| 32 | 32 | 32 | 32 | 32 | 32 | 32 | 32 | 32 | 32 | 32 | 32 | 32 | 32 | 32 |
| 16 | 16 | 16 | 16 | 16 | 16 | 16 | 16 | 16 | 16 | 16 | 16 | 16 | 16 | 16 |
| 00 | 00 | 00 | 00 | 00 | 00 | 00 | 00 | 00 | 00 | 00 | 00 | 00 | 00 | 00 |
| 16 | 16 | 16 | 16 | 16 | 16 | 16 | 16 | 16 | 16 | 16 | 16 | 16 | 16 | 16 |
| 32 | 32 | 32 | 32 | 32 | 32 | 32 | 32 | 32 | 32 | 32 | 32 | 32 | 32 | 32 |
| 48 | 48 | 48 | 48 | 48 | 48 | 48 | 48 | 48 | 48 | 48 | 48 | 48 | 48 | 48 |
| 64 | 64 | 64 | 64 | 64 | 64 | 64 | 64 | 64 | 64 | 64 | 64 | 64 | 64 | 64 |

⋮

*DistanceTable₁₁* (165°)

| 86 | 71 | 56 | 40 | 25 | 10 | 05 | 20 | 35 | 51 | 66 | 81 | 96 | 111 | 126 |
|----|----|----|----|----|----|----|----|----|----|----|----|----|-----|-----|
| 91 | 76 | 61 | 46 | 30 | 15 | 00 | 15 | 30 | 46 | 61 | 76 | 91 | 106 | 121 |
| 96 | 81 | 66 | 51 | 35 | 20 | 05 | 10 | 25 | 40 | 56 | 71 | 86 | 101 | 116 |
| 101 | 86 | 71 | 56 | 40 | 25 | 10 | 05 | 20 | 35 | 51 | 66 | 81 | 96 | 111 |
| 106 | 91 | 76 | 61 | 46 | 30 | 15 | 00 | 15 | 30 | 46 | 61 | 76 | 91 | 106 |
| 111 | 96 | 81 | 66 | 51 | 35 | 20 | 05 | 10 | 25 | 40 | 56 | 71 | 86 | 101 |
| 116 | 101 | 86 | 71 | 56 | 40 | 25 | 10 | 05 | 20 | 35 | 51 | 66 | 81 | 96 |
| 121 | 106 | 91 | 76 | 61 | 46 | 30 | 15 | 00 | 15 | 30 | 46 | 61 | 76 | 91 |
| 126 | 111 | 96 | 81 | 66 | 51 | 35 | 20 | 05 | 10 | 25 | 40 | 56 | 71 | 86 |

FIG.6A

| | 0 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 | 60 | 62 | 64 |
|---|---|---|---|---|---|---|---|---|---|---|---|---|---|---|---|---|---|---|---|---|---|---|---|---|---|---|---|---|---|---|---|---|---|
| 0 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 | 128 |
| 2 | 128 | 126 | 124 | 122 | 120 | 118 | 116 | 114 | 112 | 111 | 109 | 107 | 106 | 104 | 102 | 101 | 99 | 98 | 96 | 95 | 93 | 92 | 90 | 89 | 87 | 86 | 85 | 83 | 82 | 81 | 80 | 78 | 77 |
| 4 | 128 | 124 | 120 | 116 | 112 | 109 | 106 | 102 | 99 | 96 | 93 | 90 | 87 | 85 | 82 | 80 | 77 | 75 | 72 | 70 | 68 | 66 | 64 | 62 | 60 | 58 | 56 | 55 | 53 | 51 | 50 | 48 | 47 |
| 6 | 128 | 122 | 116 | 111 | 106 | 101 | 96 | 92 | 87 | 83 | 80 | 76 | 72 | 69 | 66 | 63 | 60 | 57 | 55 | 52 | 50 | 47 | 45 | 43 | 41 | 39 | 37 | 36 | 34 | 32 | 31 | 29 | 28 |
| 8 | 128 | 120 | 112 | 106 | 99 | 93 | 87 | 82 | 77 | 72 | 68 | 64 | 60 | 56 | 53 | 50 | 47 | 44 | 41 | 39 | 36 | 34 | 32 | 30 | 28 | 26 | 25 | 23 | 22 | 20 | 19 | 18 | 17 |
| 10 | 128 | 118 | 109 | 101 | 93 | 86 | 80 | 74 | 68 | 63 | 58 | 54 | 50 | 46 | 42 | 39 | 36 | 33 | 31 | 29 | 26 | 24 | 22 | 21 | 19 | 18 | 16 | 15 | 14 | 13 | 12 | 11 | 10 |
| 12 | 128 | 116 | 106 | 96 | 87 | 80 | 72 | 66 | 60 | 55 | 50 | 45 | 41 | 37 | 34 | 31 | 28 | 26 | 23 | 21 | 19 | 17 | 16 | 14 | 13 | 12 | 11 | 10 | 9 | 8 | 7 | 6 | 6 |
| 14 | 128 | 114 | 102 | 92 | 82 | 74 | 66 | 59 | 53 | 47 | 42 | 38 | 34 | 30 | 27 | 24 | 22 | 19 | 17 | 16 | 14 | 12 | 11 | 10 | 9 | 8 | 7 | 6 | 5 | 5 | 4 | 4 | 3 |
| 16 | 128 | 112 | 99 | 87 | 77 | 68 | 60 | 53 | 47 | 41 | 36 | 32 | 28 | 25 | 22 | 19 | 17 | 15 | 13 | 11 | 10 | 9 | 8 | 7 | 6 | 5 | 4 | 4 | 3 | 3 | 3 | 2 | 2 |
| 18 | 128 | 111 | 96 | 83 | 72 | 63 | 55 | 47 | 41 | 36 | 31 | 27 | 23 | 20 | 17 | 15 | 13 | 11 | 10 | 8 | 7 | 6 | 5 | 5 | 4 | 3 | 3 | 2 | 2 | 1 | 1 | 1 | 1 |
| 20 | 128 | 109 | 93 | 80 | 68 | 58 | 50 | 42 | 36 | 31 | 26 | 22 | 19 | 16 | 14 | 12 | 10 | 8 | 7 | 6 | 5 | 4 | 3 | 3 | 2 | 1 | 1 | 1 | 1 | 0 | 0 | 0 | 0 |
| 22 | 128 | 107 | 90 | 76 | 64 | 54 | 45 | 38 | 32 | 27 | 22 | 19 | 16 | 13 | 11 | 9 | 8 | 6 | 5 | 4 | 4 | 3 | 2 | 2 | 2 | 1 | 1 | 1 | 1 | 0 | 0 | 0 | 0 |
| 24 | 128 | 106 | 87 | 72 | 60 | 50 | 41 | 34 | 28 | 23 | 19 | 16 | 13 | 11 | 9 | 7 | 6 | 5 | 4 | 3 | 3 | 2 | 1 | 1 | 1 | 1 | 0 | 0 | 0 | 0 | 0 | 0 | 0 |
| 26 | 128 | 104 | 85 | 69 | 56 | 46 | 37 | 30 | 25 | 20 | 16 | 13 | 11 | 9 | 7 | 6 | 4 | 4 | 3 | 2 | 2 | 1 | 1 | 1 | 0 | 0 | 0 | 0 | 0 | 0 | 0 | 0 | 0 |
| 28 | 128 | 102 | 82 | 66 | 53 | 42 | 34 | 27 | 22 | 17 | 14 | 11 | 9 | 7 | 5 | 4 | 3 | 3 | 2 | 1 | 1 | 1 | 0 | 0 | 0 | 0 | 0 | 0 | 0 | 0 | 0 | 0 | 0 |
| 30 | 128 | 101 | 80 | 63 | 50 | 39 | 31 | 24 | 19 | 15 | 12 | 9 | 7 | 6 | 4 | 3 | 3 | 2 | 1 | 1 | 1 | 0 | 0 | 0 | 0 | 0 | 0 | 0 | 0 | 0 | 0 | 0 | 0 |
| 32 | 128 | 99 | 77 | 60 | 47 | 36 | 28 | 22 | 17 | 13 | 10 | 8 | 6 | 4 | 3 | 3 | 2 | 1 | 1 | 1 | 0 | 0 | 0 | 0 | 0 | 0 | 0 | 0 | 0 | 0 | 0 | 0 | 0 |
| 34 | 128 | 98 | 75 | 57 | 44 | 33 | 26 | 19 | 15 | 11 | 8 | 6 | 5 | 4 | 3 | 2 | 1 | 1 | 1 | 0 | 0 | 0 | 0 | 0 | 0 | 0 | 0 | 0 | 0 | 0 | 0 | 0 | 0 |
| 36 | 128 | 96 | 72 | 55 | 41 | 31 | 23 | 17 | 13 | 10 | 7 | 5 | 4 | 3 | 2 | 1 | 1 | 0 | 0 | 0 | 0 | 0 | 0 | 0 | 0 | 0 | 0 | 0 | 0 | 0 | 0 | 0 | 0 |
| 38 | 128 | 95 | 70 | 52 | 39 | 29 | 21 | 16 | 11 | 8 | 6 | 4 | 3 | 2 | 1 | 1 | 1 | 0 | 0 | 0 | 0 | 0 | 0 | 0 | 0 | 0 | 0 | 0 | 0 | 0 | 0 | 0 | 0 |
| 40 | 128 | 93 | 68 | 50 | 36 | 26 | 19 | 14 | 10 | 7 | 5 | 4 | 3 | 2 | 1 | 1 | 0 | 0 | 0 | 0 | 0 | 0 | 0 | 0 | 0 | 0 | 0 | 0 | 0 | 0 | 0 | 0 | 0 |
| 42 | 128 | 92 | 66 | 47 | 34 | 24 | 17 | 12 | 9 | 6 | 4 | 3 | 2 | 1 | 1 | 0 | 0 | 0 | 0 | 0 | 0 | 0 | 0 | 0 | 0 | 0 | 0 | 0 | 0 | 0 | 0 | 0 | 0 |
| 44 | 128 | 90 | 64 | 45 | 32 | 22 | 16 | 11 | 8 | 5 | 4 | 2 | 1 | 1 | 0 | 0 | 0 | 0 | 0 | 0 | 0 | 0 | 0 | 0 | 0 | 0 | 0 | 0 | 0 | 0 | 0 | 0 | 0 |
| 46 | 128 | 89 | 62 | 43 | 30 | 21 | 14 | 10 | 7 | 5 | 3 | 2 | 1 | 1 | 0 | 0 | 0 | 0 | 0 | 0 | 0 | 0 | 0 | 0 | 0 | 0 | 0 | 0 | 0 | 0 | 0 | 0 | 0 |
| 48 | 128 | 87 | 60 | 41 | 28 | 19 | 13 | 9 | 6 | 4 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 |
| 50 | 128 | 86 | 58 | 39 | 26 | 18 | 12 | 8 | 5 | 3 | 2 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 52 | 128 | 85 | 56 | 37 | 25 | 16 | 11 | 7 | 4 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 54 | 128 | 83 | 55 | 36 | 23 | 15 | 10 | 6 | 4 | 2 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 56 | 128 | 82 | 53 | 34 | 22 | 14 | 9 | 5 | 3 | 2 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 58 | 128 | 81 | 51 | 32 | 20 | 13 | 8 | 5 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 60 | 128 | 80 | 50 | 31 | 19 | 12 | 7 | 4 | 3 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 62 | 128 | 78 | 48 | 29 | 18 | 11 | 6 | 4 | 2 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

|   | 4 | 4 | 3 |
|---|---|---|---|
|   | 5 | 5 | 3 |
|   | 6 | 4 | 4 |

(b)

|   | 120 | 92  | 48 |
|---|-----|-----|----|
|   | 96  | 132 | 48 |
|   | 16  | 88  | 75 |

FIG. 8

FOCUS PIXEL + 8 ADJOINING PIXELS

| 3304 | 4030 | 5015 | 6288 | 7972 | 10138 | 12972 | 16787 | 21731 | 27778 | 36567 | 48276 | 54998 | 65694 | 54117 |
|---|---|---|---|---|---|---|---|---|---|---|---|---|---|---|
| 5119 | 6303 | 7822 | 9814 | 12177 | 15433 | 19778 | 25387 | 33025 | 43081 | 56148 | 64891 | 64426 | 54941 | 48955 |
| 7945 | 9746 | 12085 | 15065 | 18915 | 24262 | 30358 | 38815 | 50177 | 64894 | 75729 | 64325 | 57312 | 53593 | 43368 |
| 12492 | 15129 | 18906 | 23467 | 29434 | 37068 | 46987 | 60193 | 77241 | 77277 | 68389 | 54587 | 43823 | 35326 | 28711 |
| 19779 | 24105 | 29615 | 36263 | 45202 | 56737 | 71956 | 91520 | 71956 | 56737 | 45202 | 36263 | 29615 | 24105 | 19779 |
| 28711 | 35326 | 43823 | 54587 | 68389 | 77277 | 77241 | 60193 | 46987 | 37068 | 29434 | 23467 | 18906 | 15129 | 12492 |
| 43368 | 53593 | 57312 | 64325 | 75729 | 64894 | 50177 | 38815 | 30358 | 24262 | 18915 | 15065 | 12085 | 9746 | 7945 |
| 48955 | 54941 | 64426 | 64891 | 56148 | 43081 | 33025 | 25387 | 19778 | 15433 | 12177 | 9814 | 7822 | 6303 | 5119 |
| 54117 | 65694 | 54998 | 48276 | 36567 | 27778 | 21731 | 16787 | 12972 | 10138 | 7972 | 6288 | 5015 | 4030 | 3304 |

FIG. 9

VALUE AFTER DEVISION

| 01 | 01 | 01 | 02 | 02 | 02 | 03 | 04 | 05 | 07 | 09 | 12 | 13 | 16 | 13 |
|----|----|----|----|----|----|----|----|----|----|----|----|----|----|----|
| 01 | 02 | 02 | 02 | 03 | 04 | 05 | 06 | 08 | 11 | 14 | 16 | 16 | 13 | 12 |
| 02 | 02 | 03 | 04 | 05 | 06 | 07 | 09 | 12 | 16 | 18 | 16 | 14 | 13 | 11 |
| 03 | 04 | 05 | 06 | 07 | 09 | 11 | 15 | 19 | 19 | 17 | 13 | 11 | 09 | 07 |
| 05 | 06 | 07 | 09 | 11 | 14 | 18 | 22 | 18 | 14 | 11 | 09 | 07 | 06 | 05 |
| 07 | 09 | 11 | 13 | 17 | 19 | 19 | 15 | 11 | 09 | 07 | 06 | 05 | 04 | 03 |
| 11 | 13 | 14 | 16 | 18 | 16 | 12 | 09 | 07 | 06 | 05 | 04 | 03 | 02 | 02 |
| 12 | 13 | 16 | 16 | 14 | 11 | 08 | 06 | 05 | 04 | 03 | 02 | 02 | 02 | 01 |
| 13 | 16 | 13 | 12 | 09 | 07 | 05 | 04 | 03 | 02 | 02 | 02 | 01 | 01 | 01 |

FIG. 14
(a)
(b)
(c)

IMAGE PROCESSING METHOD AND IMAGING APPARATUS

BACKGROUND OF THE INVENTION

1. Field of the Invention

The present invention relates to an image processing method and an imaging apparatus for smoothing an image while retaining edges.

2. Description of the Related Art

Conventionally, filters are commonly used for digital image noise reduction in order to improve the quality of a digital still image or a digital movie.

Filters commonly used to improve image quality include Gaussian filters, median filters, and bilateral filters etc. which smoothes an image by referencing the surrounding pixels about a target pixel for correction (a focus pixel).

Gaussian filters consider the spatial position of a point and assigns heavy weights to pixels that are close to the focus pixel and light weights to pixels far from the focus pixel, and the filtering process obtains the weighted average. Median filters sort the values of the focus pixel and its surrounding pixels, and takes their median value to reduce noise, and this is commonly used for noise reduction. However, these filtering technologies have a problem where the edges of an image will also smudge with removal of noise. Therefore, bilateral filters, called edge-retaining filters, are used to retain edges of an image while reducing noise.

This filter assigns Gaussian weights to "the difference in intensity value compared to a focus pixel" and obtains the average as indicated in the equation below. Edges are retained by assigning light weights to parts where there are great changes in intensity.

$$f_i = \frac{\sum_j w(i, j) d_j}{\sum_j w(i, j)},$$

$$w(i, j) = w_x(x_i, x_j) w_d(d_i, d_j)$$

$x_j$: Position (Coordinate) of pixel j, $d_j$: Intensity of pixel j
$w_x$: Weight according to position (position weight),
$w_d$: Weight dependent on intensity (including colors)

In order to detect edges more accurately, proposed in this document is a method of capturing multiple images using different methods, detecting edges for each image, and applying a bilateral filter to the set of images. (For example, refer to Patent Document 1)

Patent Document 1: Japanese Unexamined Patent Application Publication No. 2006-180268

SUMMARY OF THE INVENTION

A challenge for noise reduction filters that are applied to digital images is the retention of edge information so as to not smudge edges of an image while reducing both high frequency noise and low frequency noise.

For example, the photographic image of hair in FIG. 14(a) often becomes smudged such as in FIG. 14(b) since the edge information could not be retained with its numerous edges running in the same direction and small pixel value differentiation between the edges. This effect is distinctly seen when trying to reduce low frequency noise.

Regarding low frequency noise, they cannot be reduced if the size of the noise reduction process reference pixel area (hereafter called "window") is too small which will cause the correction to be performed with incorrect information. On the other hand if the window is too large, that requires large volume of computation and increases processing time. Also, large windows have an effect of smudging edges. This creates an issue where necessary high frequency components of an image are reduced.

With the above circumstances taken into consideration, the object of the present invention is to provide an image processing method and an imaging apparatus to reduce low frequency noise of a digital image while retaining edge information and not increasing computational load.

In order to achieve the object, there is provided according to an aspect of the present invention with its image processing method for reducing noise of an image to be filtered by determining a noise reduction filter coefficient and calculating weighted sum, with the coefficient, of the pixel values of a focus pixel and its surrounding reference pixels of the image including a step of determining a first coefficient of the noise reduction filter by using the difference in pixel values and relative position between a focus pixel and each of its surrounding reference pixels in the source image where the source image is the target image to be filtered, a step of creating a smoothed image by smoothing pixel values within a surrounding area for each pixel in the source image, a step of determining a second coefficient of the noise reduction filter by using the difference in pixel values and relative position between a focus pixel of the source image and a pixel extracted, by every predetermined number of pixels, from the smoothed image, and a step of computing the compensated pixel value of the focus pixel in the source image with weighted sum of each pixel value applying the first coefficient to the reference pixels and the second coefficient to the pixels detected from the smoothed image.

The present invention improves the effects of low frequency noise reduction since the compensated image is created by referencing not only the source image but also the averaged image created by weight-averaging a predetermined area centered on a pixel for every pixel of the source image.

Also, according to another aspect of the present invention, an image processing method for reducing noise of an image to be filtered by determining a noise reduction filter coefficient and calculating weighted sum, with the coefficient, of the pixel values of a focus pixel and its surrounding reference pixels of the image including a step of determining a first coefficient of the noise reduction filter by using the difference in pixel values and relative position between a focus pixel and each of its surrounding reference pixels in the source image where the source image is the target image to be filtered, a step of creating a shrunken image by smoothing pixel values for every block of a predetermined size in the source image, a step of obtaining the pixel value in the shrunken image that correspond to the source image pixel by performing linear interpolation from the shrunken image pixels, a step of determining the second coefficient of the noise reduction filter by using the difference in pixel values and relative position between a focus pixel of the source image and a pixel of a certain position related to the focus pixel in the shrunk image, and a step of computing the compensated pixel value of the focus pixel in the source image by weighted sum of each pixel value applying the first coefficient to the focus pixel and the second coefficient to the pixel of the predetermined position in the linear-interpolated shrunken image.

The present invention creates a compensated image by applying the filter not only to the source image but also to its shrunken image created by averaging the pixel values for every block of predetermined size; therefore, low frequency noise can be reduced without large increase in computational volume or necessary memory. If reduction rate r is an even number, the block size is preferably (r+1) pixels by (r+1) pixels (where r is a natural number).

An image processing method related to the present invention further including a step of detecting the direction of an edge in the focus pixel by applying an edge detection filter pre-stored, and a step of determining the noise reduction coefficient from the relative position between the focus pixel and each reference pixel according to the detected edge direction.

The present invention detects the edge direction of a focus pixel, and then determines the noise reduction filter coefficient from the relative positions of a focus pixel and each reference pixel according to the edge direction, which increases the edge information retention effect.

Also, an image processing method relating to the present invention stores a distance table that indicates the relative position between a focus pixel and each reference pixel for every edge direction, and references a distance table for the appropriate detected edge direction to determine the relative position.

The present invention stores a distance table for each edge direction, which reduces computational load while determining the relative positions between a focus pixel and its reference pixels.

According to another aspect of the present invention, an image processing apparatus to create a compensated image by reducing noise in a captured image according to the difference in pixel values and relative position between a focus pixel and each of its surrounding reference pixels in the captured image including a means for storing edge detection filters, a means for storing a distance table that indicates the relative position between a focus pixel and each reference pixel for every edge direction, an image shrinking unit for creating a shrunken image by smoothing pixel values for every block of a predetermined size in the source image where the source image is the target image to be filtered an edge direction detection unit for detecting the edge direction and strength of the focus pixel by using the edge detection filter, a position weight filter composite unit for creating a position weight filter such as a Gaussian filter, a spatial filter and so on from the detected edge strength and the relative position determined by the distance table corresponding to the edge direction detected, and a pixel value calculation unit for computing the pixel value in the shrunken image that correspond to the source image pixel by performing linear interpolation from the shrunken image pixels, and computing the compensated pixel value of the focus pixel in the source image according to the pixel values obtained by applying the position weight filter to a reference pixel of the source image and the pixel values obtained by applying the position weight filter to a pixel of a certain coordinate related to the focus pixel in the shrunk image.

According to this invention, a position weight filter is created based on relative distance of edge direction, and compensated pixel values of source image are calculated from pixel values obtained by applying the position weight filter to the source image and its shrunken image; therefore, highly effective low frequency noise reduced image can be obtained while retaining edge information.

According to the present invention, it is possible to reduce low frequency noise while retaining edges in images where bilateral filtering cannot retain the edges since not only are the differences in the distance and intensity value between a focus pixel and reference pixels determined, but edge directions are also taken into account when creating the filter.

BRIEF DESCRIPTION OF THE DRAWINGS

FIG. 3 is a data structure example of edge detection filters 33 of FIG. 1.

FIG. 4 is a data structure example of distance tables 36 of FIG. 1.

FIG. 6A, FIG. 6B are a table of $128 \times \exp^{-Distance(m,n) \times Imp}$ values where rows are Distance and columns are Imp as computed by position weight filter composite unit 24 in FIG. 1. FIG. 6A is the upper half of the table and FIG. 6B is the lower half of the table.

FIG. 7 are data used for describing weight averaged filter composite process, where FIG. 7(a) is the edge direction data for the adjoining 8 pixels centered on the focus pixel, and FIG. 7(b) is the corresponding edge strength data for the same pixel positions.

FIG. 8 is a data structure example of a weight averaged filter of focus pixel (target point) and its 8 adjoining pixels.

FIG. 9 is a data structure example of a position weight filter 37 in FIG. 1.

FIG. 14 are descriptive diagrams that show the effects of edge retaining noise reduction filters, where FIG. 14(a) is the captured image, FIG. 14(b) is the image after existing bilateral filter noise reduction process, and FIG. 14(c) is the image after the noise reduction process performed by the image processing method of an embodiment of this invention.

DESCRIPTION OF THE PREFERRED EMBODIMENTS

A noise reduction algorithm for a preferred embodiment in accordance with this invention utilizes the surrounding M by N pixels of each pixel to obtain a pixel value after reducing noise.

Figure 1:
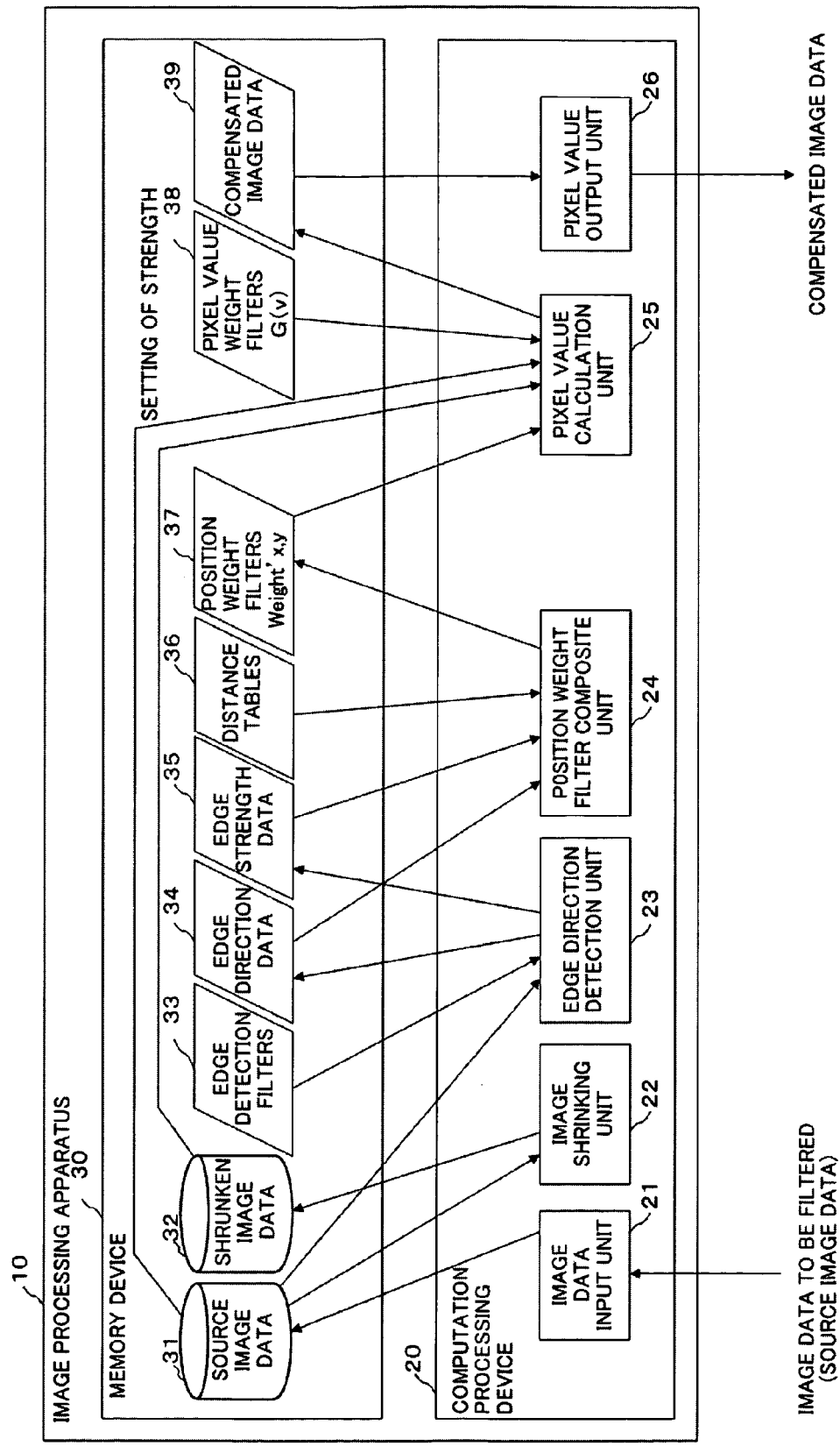
FIG. 1 is a functional block diagram of image processing apparatus 10 in the first embodiment of this invention.

FIG. 1 is the functional block diagram of image processing apparatus 10 of the first embodiment. In this diagram, image processing apparatus 10 is realized by a computing apparatus such as a personal computer or other apparatus with CPU capability, and it also contains computational processing device 20 to execute a noise reduction process and memory device 30 to store data.

Also, computational processing device 20 contains image data input unit 21 to input image data to be filtered in memory device 30, image shrinking unit 22 to create an averaged shrunken image to pseudo enlarge window size, edge direction detection unit 23 to compute the edge strength and direction for each pixel of the image, position weight filter composite unit 24 to create a filter that indicates weight for noise reduction of surrounding pixels according to edge strength and direction computed in edge direction detection unit 23, pixel value calculation unit 25 to calculate the noise reduced pixel value according to average weight of composite pixel value difference and position weight relating to each surrounding pixel, and pixel value output unit 26 to output compensated pixel value as data calculated in pixel value calculation unit 25. Each unit 21 to 26 can be implemented as a program that is a function of computational process device 20.

Next, operation of image processing apparatus 10 containing above configuration is described.

(Fundamental Data Registration Process)

First, store edge detection filters 31, distance tables 36, and pixel value weight data 38 into memory device 30.

(Input Process for Image to be Filtered)

Image data input unit 21 is used to input image to be filtered (called "image to be filtered") into source image data storage area 31 of memory device 30.

(Image Shrinking Process)

Next, image shrinking unit 22 applies equation (1) below on filtering image data (hereafter called "source image data") stored in source image data storage area 31 to create shrunken image of shrinking ratio r by averaging the pixel values (YUV values) for each pixel in a block where block size is (r+1) pixels by (r+1) pixels (where r is a natural number) for every r pixels that is chosen as the center.

$$S\left(\frac{x}{r}, \frac{y}{r}\right) = \frac{\sum_{i=-\frac{r}{2}}^{\frac{r}{2}} \sum_{j=-\frac{r}{2}}^{\frac{r}{2}} P(x+i, y+j)}{(r+1)(r+1)} \quad (1)$$

Here, parameter x, y is the target pixel coordinate and r is the shrinking ratio. Also, function P(x, y) is the pixel value of coordinate (x, y) and S(x/r, y/r) is the pixel value for the pixel at shrunken coordinate (x/r, y/r) (where x/r and y/r are integers).

If r is an even number, window size for shrinking rate r is (r+1) by (r+1), and if r is an odd number then it is r by r. This is preferable since this ensures that the window will be centralized even if r is an even number.

Figure 2:
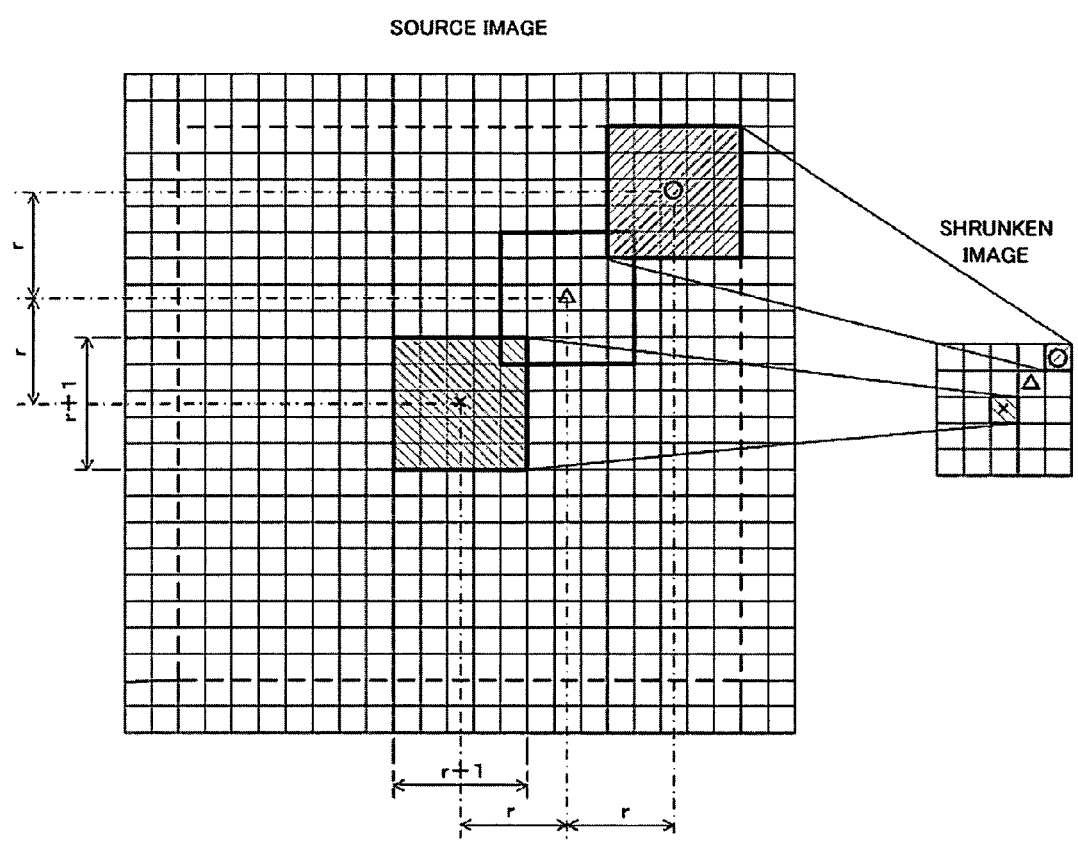
FIG. 2 is a descriptive drawing of the corresponding relationship between a source image and its shrunken image created using image processing method of the embodiment of this invention.

FIG. 2 is the description of the corresponding relationship between the source image and its shrunken image where shrunken image is created by the above equation. If r=4, every 4 pixel is a focus pixel, and the pixel values of an area of +/−2 pixels surrounding every focus pixel is averaged for the pixel value of the shrunken image.

By referencing this shrunken image, the area (as indicated by the dashed line) of the source image can be pseudo referenced by the window enlargement ratio.

Noise reduction filter application should be performed on a larger area for a more effective low frequency noise reduction. However, enlarging the window widens the reference and increases the calculation volume. On the other hand if reference points are arbitrarily line skipped, that will lead to loss of information.

According to the image shrinking process of this embodiment, the loss of information such as edge and color can be lowered compared to simply pixel skipping since the obtained pixel value is the average YUV value for each window centered on target pixel and is used according to the shrinking ratio.

Below is the description for window size of 5 pixels by 5 pixels.

(Edge Direction Detection Process)

Next, obtain edge strength and direction by applying a filter to a 5 pixels by 5 pixels window centered on the focus pixel using edge direction detection unit 23. At this point, in order to detect a local edge direction, the reference pixels used are in the source image window.

Edge direction detection unit 23 computes the edge strength and direction for 12 directions (0°, 15°, 30°, 45°, 60°, 75°, 90°, 105°, 120°, 135°, 150°, 165°). At this point, use only the Y value in YUV to obtain edge direction. First, define the 12 types of 5 pixels by 5 pixels edge detection filter $EF_k\{k=0, 1, 2, \ldots, 11\}$ corresponding to each of the 12 directions as shown in FIG. 3 and store this edge detection filter data in edge filters storage area 33 of memory device 30. Here, edge detection filter data comprises edge enhancement filter such as described in Patent Application Publication No. 2006-262204 where the number of reference pixels changes depending on the direction indicated by degree but is configured with the lowest common multiple so that the sum of values within each filter is the same.

Then, perform the 12 types of edge detection filter convolution on the 5 pixels by 5 pixels window centered on target pixel for noise reduction process P(x, y) {x, y: 2≦x≦width−2, 2≦y≦height−2}. For each direction k, obtain edge strength $EdgeDegree_k$ with equation (2).

$$EdgeDegree_k = \left| \sum_{i=-2}^{2} \sum_{j=2}^{2} EF_k(i+2, j+2) \cdot P(x+i, y+j) \right| \quad (2)$$

Here, variable K is the edge direction number that corresponds to each edge detection filter, variable $EF_k(x, y)$ is the direction k edge detection filter, P(x, y) is the pixel value of coordinate x, y, and $EdgeDegree_k$ is the edge strength.

Next, obtain $EdgeDegree_k$ for each direction, and then by equation (3) obtain the EdgeDirection that maximizes edge strength.

$$EdgeDirection = \arg\max_k EdgeDegree_k \quad (3)$$

Here, $EdgeDegree_k$ is the edge strength for direction number=k, and EdgeDirection is the direction number after edge detection.

Also, apply equation (4) to obtain the edge strength EdgeDegree corresponding to EdgeDirection with the direction of maximum edge strength. Here EdgeDegree+90° indicates the edge direction number that is perpendicular to EdgeDirection.

$$EdgeDegree = \min(EdgeDegree_{EdgeDirection} - EdgeDegree_{(EdgeDirection+90°)}, 255) \quad (4)$$

Here, EdgeDegree indicates edge strength.

If there is noise, the direction+90° has a tendency of having a large edge strength, so as in equation (4) the effect of background noise on edge strength can be lessened by subtracting the edge strength of the +90° edge.

Edge direction detection unit 23 computes as above for each pixel, and store edge direction and edge strength of each pixel into edge direction data storage area 34 and edge strength data storage area 35, respectively.

(Position Weight Filter Composite Process)

Next, create position weight filter to weigh a distance according to edge direction by using position weight filter composite unit 24.

As indicated in FIG. 4, store in advance distance tables 36 in memory device 30 that define the distance from the edge for each edge direction of the focus pixel.

Filter size can be arbitrary, if it is small the reference area will be small, and if it is large the computational volume will be large and information from unnecessarily far pixels will be included, so empirically approximately 7 pixels by 7 pixels is preferable.

Figure 5:
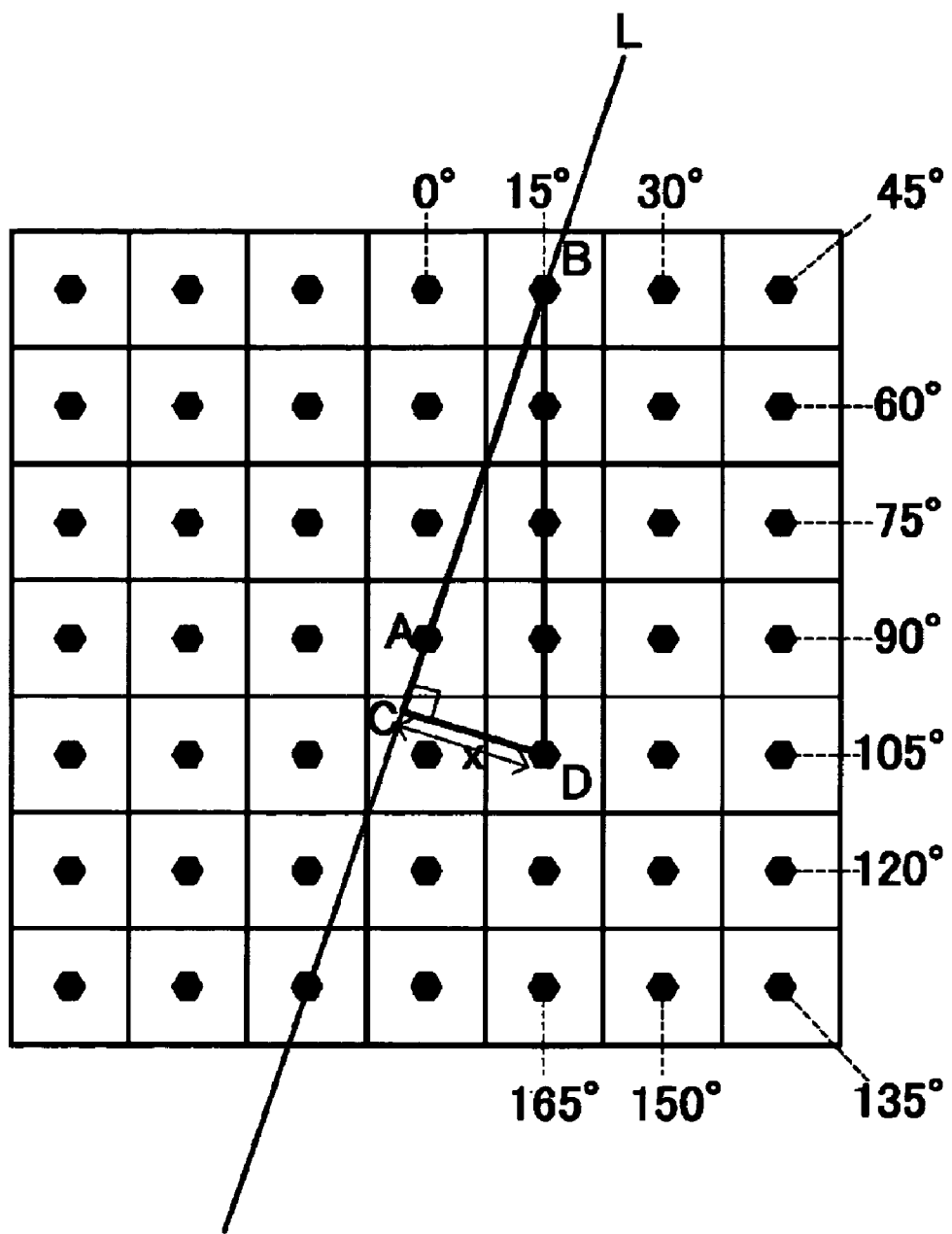
FIG. 5 is a descriptive drawing of creating a distance table 36 in FIG. 4.

FIG. 5 describes how to create a distance table 36. Map an angle in the 7 by 7 pixel window where the center pixel is A. Assign an arbitrary distance between adjoining perpendicular or parallel pixels (for example, 16), then calculate the length (x) of the perpendicular line (for example, to the pixel D in the diagram) to the diagonal line L running through the center for each pixel. Use geometry to obtain the distances between each pixel in the window to a line with a certain angle (pseudo edge).

Define the distance from the focus pixel for each reference pixel according to pixel tables 36 with the edge direction obtained in edge direction detection unit 23. At this point the distance is not the straight distance between two points but is the distance with the edge considered, that is, the distance is measured from the pseudo edge.

Next, create a weighted averaged filter Weight$_{x,y}$(m, n) according to the edge direction detected by edge detection unit 23.

First, assign weight to each pixel in the m by n pixel area according to the distance from the straight line of the edge direction. Distances for each pixel in the m by n pixel area to an edge direction straight line are defined as below.

$$\text{Distance}(m,n) = \text{DistanceTable}_{EdgeDirection(x,y)}(m,n) \quad (5)$$

Determine weight based on the equation below using distance Distance obtained as above, edge importance Imp, and edge strength obtained from edge direction detection unit 23. Thus, a weighted averaged filter about a focus pixel is generated.

$$\text{Weight}_{x,y}(m,n) = \text{EdgeDegree}(x,y) \times 128 \times \exp^{-Distance(m,n) \times Imp} \quad (6)$$

Here, variable x, y indicate target pixel coordinate, and Distance(m,n) is the distance from the edge direction straight line of relative pixel coordinate (m, n) based on focus pixel coordinate (x, y) in the window. Imp indicates edge importance, and it can be configured for specific purpose. For example, Imp is determined according to attributes such as image capture module 2 noise levels. Also, function Weight indicates weight of focus pixel coordinate (x, y).

Figure 6B:
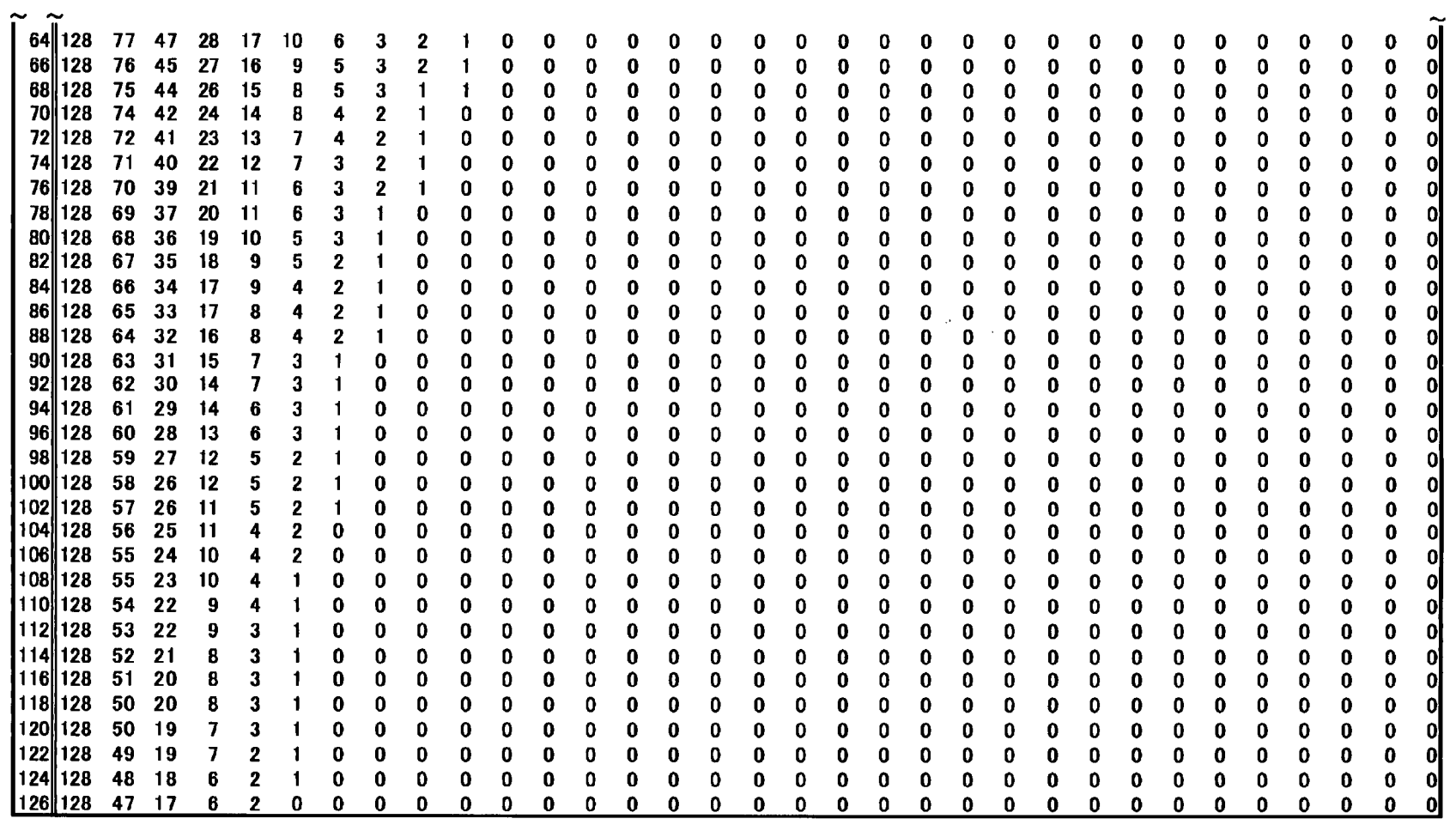

Value of $128 \times \exp^{-Distance(m,n) \times Imp}$ determined from Distance and Imp is as in FIG. 6A and FIG. 6B. In this diagram, vertical axis (column) is Distance and horizontal axis (row) is Imp.

Next, composite weighted average filter for each of the 8 adjoining pixels by referencing their edge direction by considering the effects of noise from the edge direction detection.

Specifically, composite a weighted average filter of a focus pixel and its adjoining pixels (3 by 3) by applying the equation (7) below.

$$\text{Weight}'_{x,y}(m,n) = \frac{\sum_{i=-1}^{1}\sum_{j=-1}^{1} \text{Weight}_{x+i,y+j}(m,n)}{C} \quad (7)$$

Here, function Weight$_{x,y}$ is the weighted average filter of coordinate x, y, and Weight'$_{x,y}$ is the weighted average filter after compositing the 8 neighboring pixels. Use an arbitrary value for right side denominator C since it is a constant to decrease the number of bits in order to create hardware.

Example

Now, if the 3 by 3 pixel window contains edge direction indicated in FIG. 7(a), edge strength indicated in FIG. 7(b), and Imp=8, then each weighted average filter Weight$_{x,y}$(m, n) and their values are as below.

Edge Direction: 3

Figure 7:
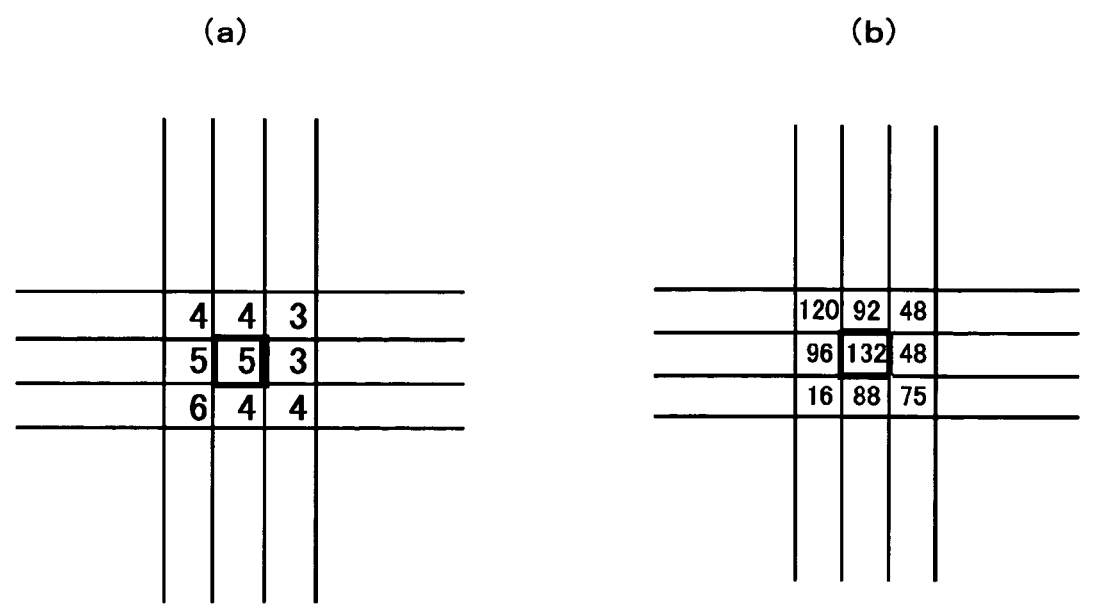

There are 2 edge direction "3" contained in the focus pixel and its neighboring 8 pixels in FIG. 7(a), and edge strength for the pixel position are both "48." Then,

TABLE 1

| (48 + 48) × | | | | | | | | | | | | | | |
|---|---|---|---|---|---|---|---|---|---|---|---|---|---|---|
| 2 | 3 | 5 | 7 | 10 | 15 | 21 | 31 | 44 | 62 | 90 | 128 | 90 | 62 | 44 |
| 3 | 5 | 7 | 10 | 15 | 21 | 31 | 44 | 62 | 90 | 128 | 90 | 62 | 44 | 31 |
| 5 | 7 | 10 | 15 | 21 | 31 | 44 | 62 | 90 | 128 | 90 | 62 | 44 | 31 | 21 |
| 7 | 10 | 15 | 21 | 31 | 44 | 62 | 90 | 128 | 90 | 62 | 44 | 31 | 21 | 15 |
| 10 | 15 | 21 | 31 | 44 | 62 | 90 | 128 | 90 | 62 | 44 | 31 | 21 | 15 | 10 |
| 15 | 21 | 31 | 44 | 62 | 90 | 128 | 90 | 62 | 44 | 31 | 21 | 15 | 10 | 7 |
| 21 | 31 | 44 | 62 | 90 | 128 | 90 | 62 | 44 | 31 | 21 | 15 | 10 | 7 | 5 |
| 31 | 44 | 62 | 90 | 128 | 90 | 62 | 44 | 31 | 21 | 15 | 10 | 7 | 5 | 3 |
| 44 | 62 | 90 | 128 | 90 | 62 | 44 | 31 | 21 | 15 | 10 | 7 | 5 | 3 | 2 |

Here, above table is weighted average filter Weight$_{x,y}$(m, n) of edge direction 3 calculated based on FIG. 6A and FIG. 6B. This means the product of each value in above table and edge strength for edge direction 3.

Edge Direction: 4

Similarly, there are 4 edge direction "4" with edge strengths "120," "92," "88," and "75". Then,

TABLE 2

| (120 + 92 + 88 + 75) × | | | | | | | | | | | | | | |
|---|---|---|---|---|---|---|---|---|---|---|---|---|---|---|
| 3 | 4 | 5 | 7 | 10 | 13 | 18 | 24 | 32 | 41 | 55 | 72 | 96 | 128 | 96 |
| 5 | 6 | 9 | 12 | 15 | 20 | 27 | 36 | 48 | 64 | 85 | 112 | 112 | 85 | 64 |
| 7 | 10 | 13 | 18 | 24 | 32 | 41 | 55 | 72 | 96 | 128 | 96 | 72 | 55 | 41 |
| 12 | 15 | 20 | 27 | 36 | 48 | 64 | 85 | 112 | 112 | 85 | 64 | 48 | 36 | 27 |
| 18 | 24 | 32 | 41 | 55 | 72 | 96 | 128 | 96 | 72 | 55 | 41 | 32 | 24 | 18 |

TABLE 2-continued

| (120 + 92 + 88 + 75) × | | | | | | | | | | | | | | |
|---|---|---|---|---|---|---|---|---|---|---|---|---|---|---|
| 27 | 36 | 48 | 64 | 85 | 112 | 112 | 85 | 64 | 48 | 36 | 27 | 20 | 15 | 12 |
| 41 | 55 | 72 | 96 | 128 | 96 | 72 | 55 | 41 | 32 | 24 | 18 | 13 | 10 | 7 |
| 64 | 85 | 112 | 112 | 85 | 64 | 48 | 36 | 27 | 20 | 15 | 12 | 9 | 6 | 5 |
| 96 | 128 | 96 | 72 | 55 | 41 | 32 | 24 | 18 | 13 | 10 | 7 | 5 | 4 | 3 |

Edge Direction: 5
Also there are 2 edge direction "5" with edge strengths "96" and "132." Then,

TABLE 3

| (96 + 132) × | | | | | | | | | | | | | | |
|---|---|---|---|---|---|---|---|---|---|---|---|---|---|---|
| 6 | 7 | 8 | 10 | 11 | 13 | 16 | 19 | 22 | 26 | 30 | 36 | 42 | 50 | 58 |
| 10 | 11 | 13 | 16 | 19 | 22 | 26 | 30 | 36 | 42 | 50 | 58 | 68 | 80 | 93 |
| 16 | 19 | 22 | 26 | 30 | 36 | 42 | 50 | 58 | 68 | 80 | 93 | 109 | 128 | 109 |
| 26 | 30 | 36 | 42 | 50 | 58 | 68 | 80 | 93 | 109 | 128 | 109 | 93 | 80 | 68 |
| 42 | 50 | 58 | 68 | 80 | 93 | 109 | 128 | 109 | 93 | 80 | 68 | 58 | 50 | 42 |
| 68 | 80 | 93 | 109 | 128 | 109 | 93 | 80 | 68 | 58 | 50 | 42 | 36 | 30 | 26 |
| 109 | 128 | 109 | 93 | 80 | 68 | 58 | 50 | 42 | 36 | 30 | 26 | 22 | 19 | 16 |
| 93 | 80 | 68 | 58 | 50 | 42 | 36 | 30 | 26 | 22 | 19 | 16 | 13 | 11 | 10 |
| 58 | 50 | 42 | 36 | 30 | 26 | 22 | 19 | 16 | 13 | 11 | 10 | 8 | 7 | 6 |

Edge Direction: 6
Also there is 1 edge direction "6" and its edge strength is "16." Then,

TABLE 4

| (16) × | | | | | | | | | | | | | | |
|---|---|---|---|---|---|---|---|---|---|---|---|---|---|---|
| 17 | 17 | 17 | 17 | 17 | 17 | 17 | 17 | 17 | 17 | 17 | 17 | 17 | 17 | 17 |
| 28 | 28 | 28 | 28 | 28 | 28 | 28 | 28 | 28 | 28 | 28 | 28 | 28 | 28 | 28 |
| 47 | 47 | 47 | 47 | 47 | 47 | 47 | 47 | 47 | 47 | 47 | 47 | 47 | 47 | 47 |
| 77 | 77 | 77 | 77 | 77 | 77 | 77 | 77 | 77 | 77 | 77 | 77 | 77 | 77 | 77 |
| 128 | 128 | 128 | 128 | 128 | 128 | 128 | 128 | 128 | 128 | 128 | 128 | 128 | 128 | 128 |
| 77 | 77 | 77 | 77 | 77 | 77 | 77 | 77 | 77 | 77 | 77 | 77 | 77 | 77 | 77 |
| 47 | 47 | 47 | 47 | 47 | 47 | 47 | 47 | 47 | 47 | 47 | 47 | 47 | 47 | 47 |
| 28 | 28 | 28 | 28 | 28 | 28 | 28 | 28 | 28 | 28 | 28 | 28 | 28 | 28 | 28 |
| 17 | 17 | 17 | 17 | 17 | 17 | 17 | 17 | 17 | 17 | 17 | 17 | 17 | 17 | 17 |

Therefore, the weighted average filter combining the 8 adjoining pixels is as in FIG. 8. Then divide by arbitrary value C (for example C=4096) to obtain position weight filter in FIG. 9.

(Pixel Value Calculation Process)

Next, pixel value calculation unit 25 performs the summation process, by applying equation (8), which considers position weight and pixel value difference weight for each of the source image and the shrunken image.

Therefore, with noise reduction filter indicated in equation (8), perform weight averaging according to Gaussian distribution by combining weight from relative position of pixel to be processed by position weight filter composite unit 24 and the difference with the YUV value of the focus pixel for each YUV value. ∥ represents obtaining absolute difference value for each YUV value, and calculating its sum.

$$P'(x, y) = \frac{\sum_{i=-\frac{M}{2}}^{\frac{M}{2}} \sum_{j=-\frac{N}{2}}^{\frac{N}{2}} W_O(i, j) P(x+i, y+j) + \sum_{i=-\frac{M}{2}}^{\frac{M}{2}} \sum_{j=-\frac{N}{2}}^{\frac{N}{2}} W_S(i, j) S_{bilinear}\left(\frac{x}{r}+i, \frac{y}{r}+j\right)}{\sum_{i=-\frac{M}{2}}^{\frac{M}{2}} \sum_{j=-\frac{N}{2}}^{\frac{N}{2}} W_O(i, j) + \sum_{i=-\frac{M}{2}}^{\frac{M}{2}} \sum_{j=-\frac{N}{2}}^{\frac{N}{2}} W_S(i, j)} \quad (8)$$

where, $$W_O(i, j) = Weight'_{x,y}\left(i+\frac{M}{2}, j+\frac{N}{2}\right) \cdot G(\|P(x+i, y+j) - P(x, y)\|/4).$$

-continued $$W_s(i, j) = Weight'_{x,y}\left(i + \frac{M}{2}, j + \frac{N}{2}\right) \cdot G\left(\left\|S_{bilinear}\left(\frac{x}{r} + i, \frac{y}{r} + j\right) - P(x, y)\right\| / 16\right).$$

$$G(v) = e^{-\left(\frac{v \times strength}{128}\right)^2} \times 128$$

Here, variable x, y is the pixel coordinate of the focus pixel, P(x, y) is the pixel value of coordinate (x, y), S(x, y) is the pixel value in shrunken image, r is shrinking rate of shrunken image, P'(x, y) is the pixel value after noise reduction, M, N is the window size of reference pixels, strength is a value determined for an objective and an image capturing device and its range is normally between 4 and 1024. Also, G(v) is a function that becomes a lower value as v becomes larger, and is adjusted depending on its use and objective. Variable i, j indicates relative position of its surroundings. $W_o$ and $W_s$ are noise reduction filter coefficients (1st coefficient and 2nd coefficient) as they apply to the source image and shrunken image, respectively.

Computational process of equation (8) can be calculated each time pixel value becomes necessary, or all pixel values can be initially calculated using linear interpolation and stored in memory device 30 depending on the amount of memory. In equation (8), M/2 and N/2 are rounded down to the nearest integer for computation.

Figure 10:
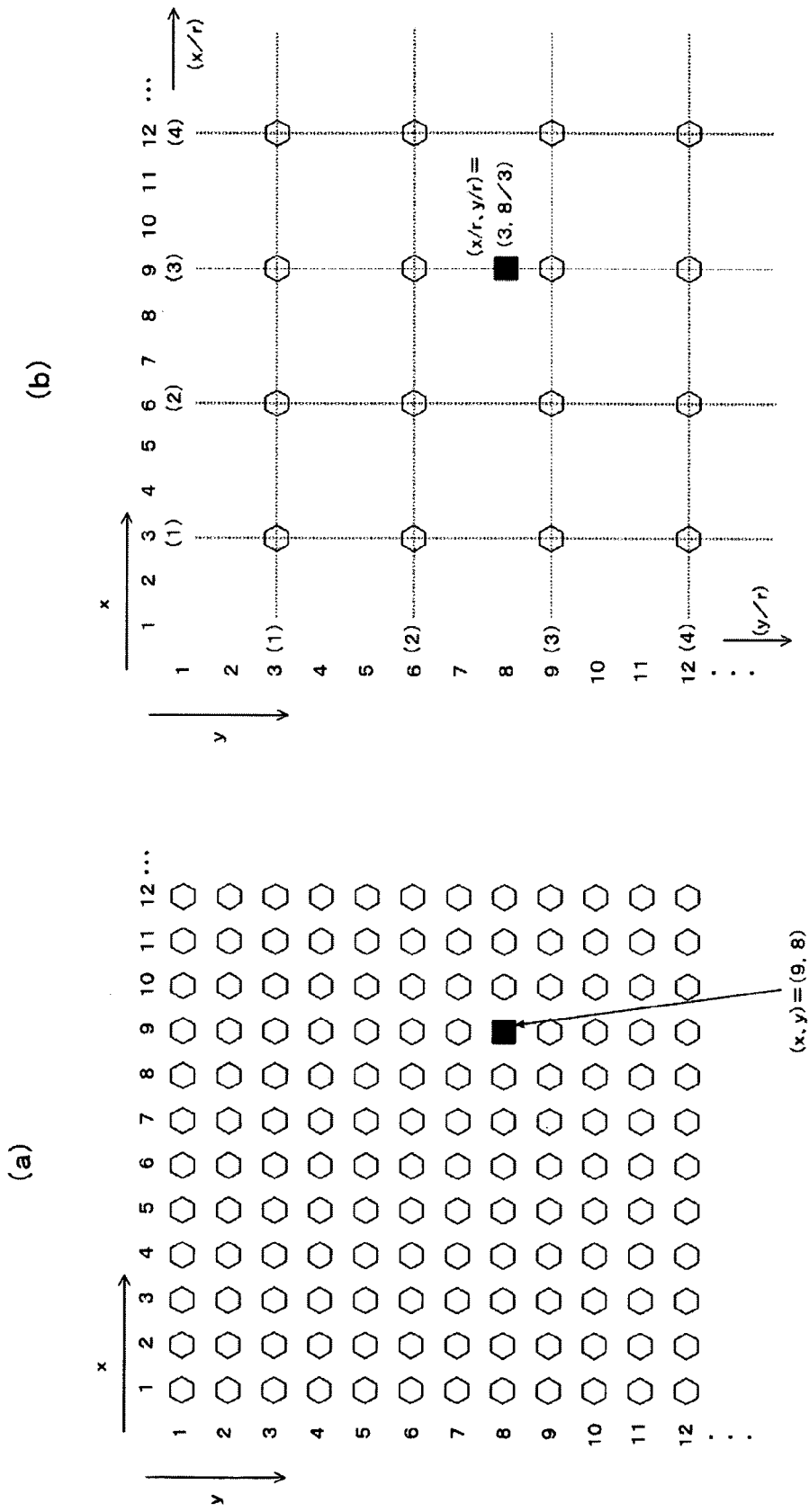
FIG. 10 is a descriptive drawing of a way of thinking about the computation in pixel value calculation unit 25 of FIG. 1, and pixel positions of corresponding source image and shrunken image are shown.

FIG. 10 indicates corresponding pixel positions between source image and shrunken image. Coordinate in position weight Weight$_{x,y}$ uses intercept of (0, 0) at the top left corner of weighted average filter, where x is in the right direction and y is in the down direction. They are 0≦i+M/2<M and 0≦i+N/2≦N respectively. In FIG. 10(a), corresponding coordinate for (x, y)=(9, 8) in the shrunken image is (x/r, y/r)=(3, 8/3) in FIG. 10(b), and when the number is not evenly divisible, where x/r or y/r is not an integer, then use linear interpolation. Linear interpolated pixel value in equation (8) is shown as $S_{bilinear}$.

Figure 11:
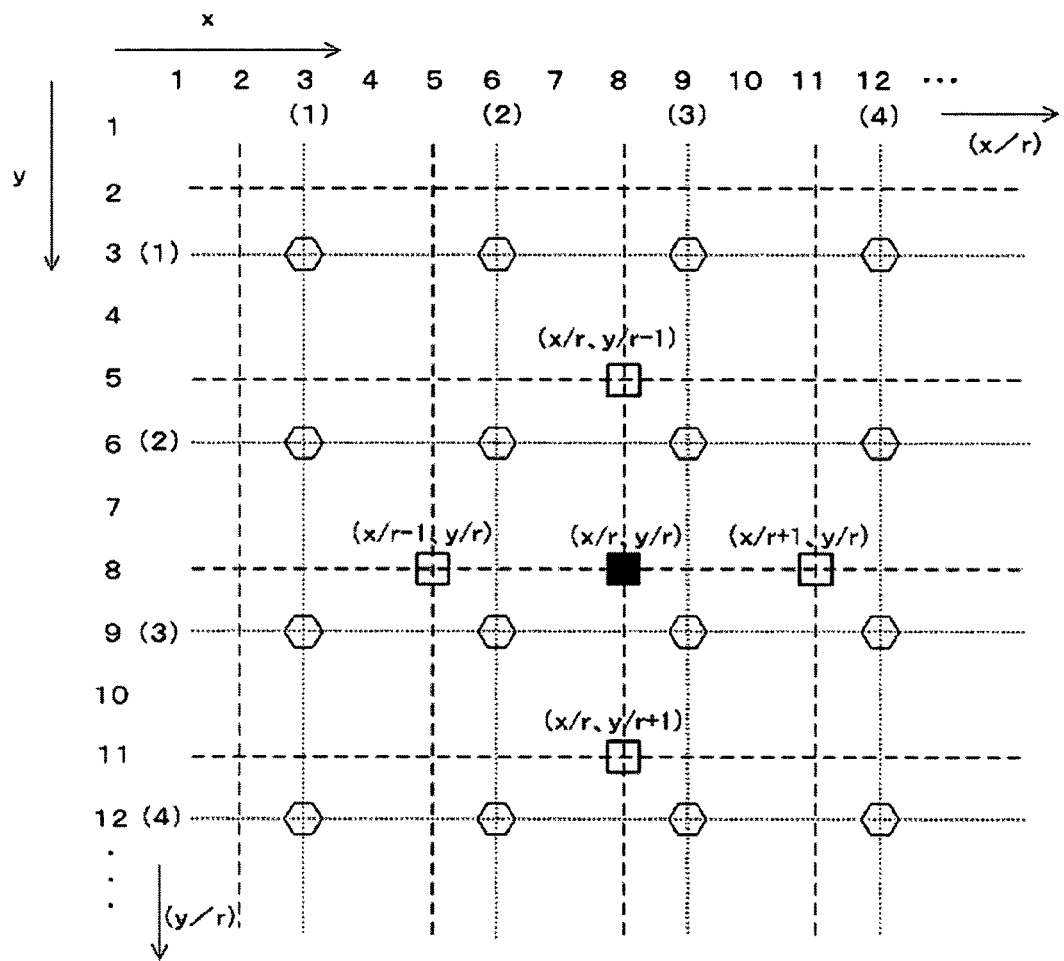
FIG. 11 is a descriptive drawing of pixel positions of a shrunken image.

Also, in FIG. 11, if the center is (x/r, y/r), then (x/r+i, y/r+j), where i and j are integers, are coordinates of intersections of broken lines. Use linear interpolation to determine pixel values.

Store noise reduced pixel value P'(x, y) for each pixel coordinate (x, y) in compensated image data storage area 39 as compensated image data.

(Pixel Value Output Process)

Output compensated image data stored in compensated image data storage area 39 by using Pixel value output unit 26. FIG. 14(c) is the image after performing noise reduction using this embodiment on the image of FIG. 14(a). It is clear that the hair image is sharper when compared to compensated image in FIG. 14(b) which was created using an existing technique.

According to this embodiment of the present invention, it is possible to retain edges and reduce low frequency noise since edge directions are taken into consideration when creating filters in addition to the differences between distance and intensity of focus pixel and reference pixels.

Figure 12:
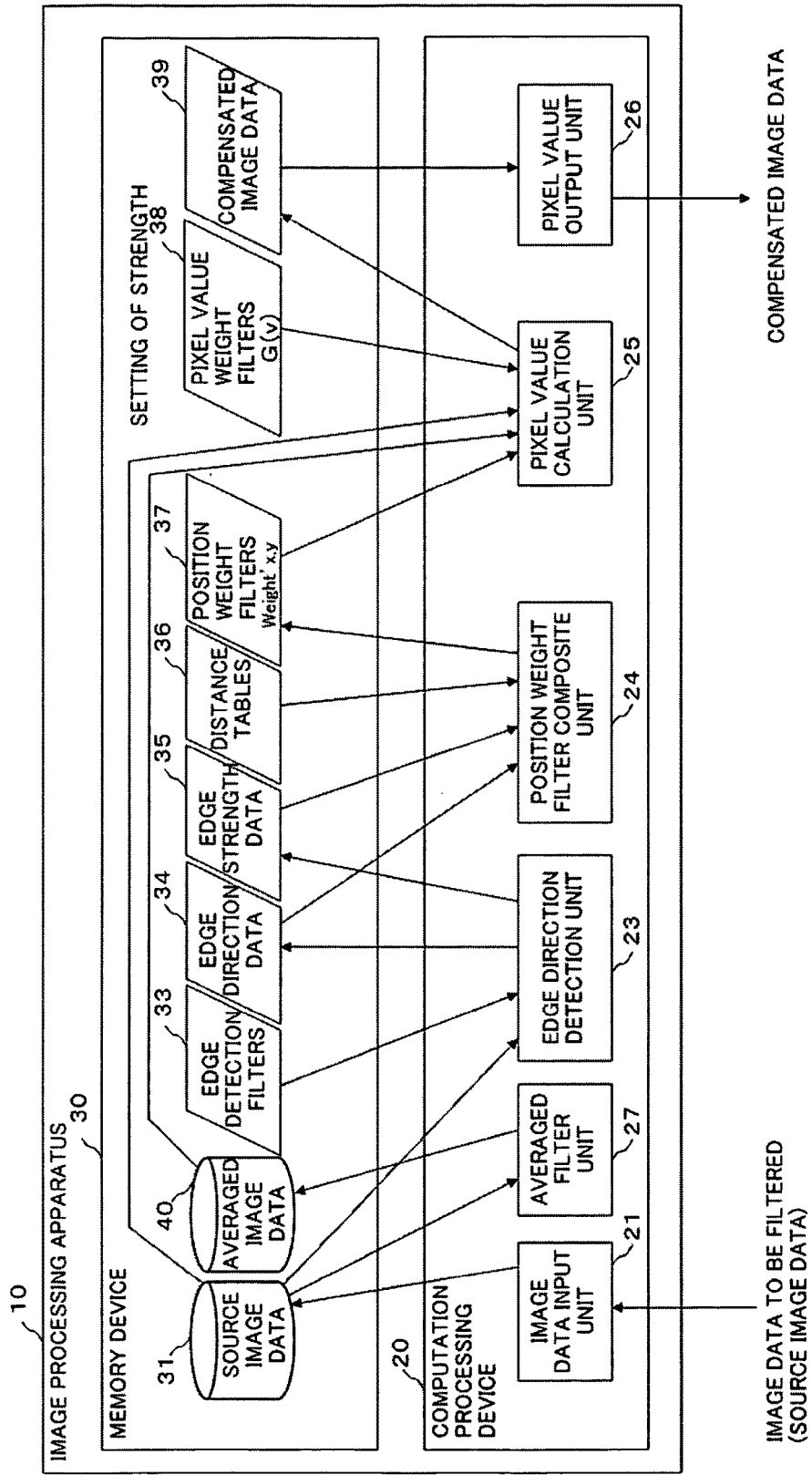
FIG. 12 is a functional block diagram of image processing apparatus 10 of the second embodiment of this invention.

A second embodiment of the present invention is described here. FIG. 12 is a block diagram of image processing device 10 of this embodiment. The difference from FIG. 1 is that image shrinking unit 22 is replaced with averaging filter unit 27 which averages pixel values of pixels surrounding a pixel for each pixel of a source image.

For this embodiment, the difference in operation of image processing device 10 from the first embodiment is described below. Descriptions of basic data registration process, filtering image input process, edge direction detection process, position weight filter compositing process, and pixel value output process are omitted here since they are the same as in the first embodiment.

For the averaging process, averaging filter unit 27, averaged image is created by applying equation (9) below to a source image data stored in the source image data storage area 31 and averaging the pixel values (YUV value) in an (r+1) by (r+1) pixel block centered on each pixel in the source image.

$$A(x, y) = \frac{\sum_{i=-\frac{r}{2}}^{\frac{r}{2}} \sum_{j=-\frac{r}{2}}^{\frac{r}{2}} P(x+i, y+j)}{(r+1)(r+1)} \quad (9)$$

Variable x, y is the target pixel coordinate, r determines the area to perform averaging process, function P(x, y) is the pixel value at coordinate (x, y), and A(x, y) is the pixel value after the averaging process.

In the pixel value calculation process, pixel value calculation unit 25 creates compensated image data P'(x, y) by applying equation (8) described in the first embodiment and replacing $S_{bilinear}$(x/r+i,y/r+j) with A(x+ri, y+rj) which takes into consideration position weight and pixel value weight in the summation process for both the source image and averaged image.

According to this embodiment of the present invention, edges can be retained while reducing low frequency noise, as in the first embodiment.

In the above description, pixel values in a block was averaged to create an averaged image in the averaging process; however, weighted average depending on pixel position within a block can also be used, or another smoothing process such as taking the median value of pixel values of multiple pixels in a block to create a smoothed image. Here, "smoothing" includes concepts such as averaging.

A third embodiment of the present invention is described here.

Figure 13:
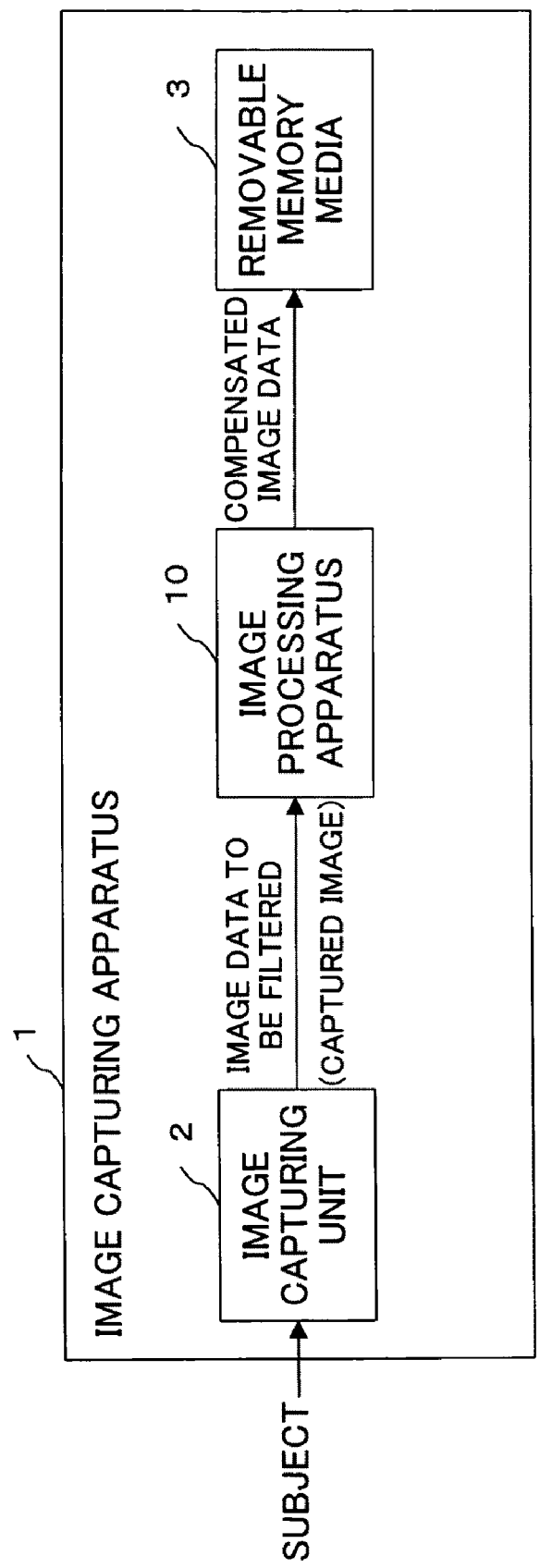
FIG. 13 is a block diagram of the image capturing apparatus of the third embodiment of this invention.

FIG. 13 is the block diagram of image capturing apparatus 1 of this embodiment. In this diagram, image capturing apparatus 1 consists of image capturing unit 2, image processing apparatus 10 which creates compensated image by performing noise reduction process on a captured image, and memory media 3 which stores compensated data in a removable media such as an SD card. USB interface can be used for data transfer instead of memory media 3. Image processing device 10 has the architecture and behavior that is the same as described in the first embodiment or the second embodiment.

Image capturing apparatus 1 in the architecture above captures an image of a subject with image capturing unit 2, the captured image becomes image data to be filtered, it is sent to image processing apparatus 10, in image processing apparatus 10 create compensated image data by performing noise reduction process with the processing method described in the first embodiment, and then store the output in removable memory media 3. User can also obtain noise reduced photo image by attaching a printing device, which is not drawn in the diagram, to the memory media 3 and printing an image.

The present invention can be implemented as an image processing apparatus in an image processing program for a computer, or in other devices such as a digital camera or a mobile phone. Image processing apparatus includes on-chip ISP (Image Signal Processor) that are embedded in image capturing apparatus.

What is claimed is:

1. An image processing method for reducing noise of an image to be filtered by determining a noise reduction filter coefficient and calculating weighted sum, with the coefficient, of the pixel values of a focus pixel and its surrounding reference pixels of the image, comprising:
   a step of determining a first coefficient of the noise reduction filter by using the difference in pixel values and relative position between a focus pixel and each of its surrounding reference pixels in the source image where the source image is the target image to be filtered;
   a step of creating a smoothed image by smoothing pixel values within a surrounding area for each pixel in the source image;
   a step of determining a second coefficient of the noise reduction filter by using the difference in pixel values and relative position between a focus pixel of the source image and a pixel extracted, by every predetermined number of pixels, from the smoothed image; and
   a step of computing the compensated pixel value of the focus pixel in the source image with weighted sum of each pixel value applying the first coefficient to the reference pixels and the second coefficient to the pixels detected from the smoothed image.

2. An image processing method for reducing noise of an image to be filtered by determining a noise reduction filter coefficient and calculating weighted sum, with the coefficient, of the pixel values of a focus pixel and its surrounding reference pixels of the image, comprising:
   a step of determining a first coefficient of the noise reduction filter by using the difference in pixel values and relative position between a focus pixel and each of its surrounding reference pixels in the source image where the source image is the target image to be filtered;
   a step of creating a shrunken image by smoothing pixel values for every block of a predetermined size in the source image;
   a step of obtaining the pixel value in the shrunken image that correspond to the source image pixel by performing linear interpolation from the shrunken image pixels;
   a step of determining the second coefficient of the noise reduction filter by using the difference in pixel values and relative position between a focus pixel of the source image and a pixel of a certain coordinate related to the focus pixel in the shrunk image; and
   a step of computing the compensated pixel value of the focus pixel in the source image by weighted sum of each pixel value applying the first coefficient to the focus pixel and the second coefficient to the pixel of the predetermined coordinate in the linear-interpolated shrunken image.

3. The image processing method according to claim 1 or 2, further comprising:
   a step of detecting the direction of an edge in the focus pixel by applying an edge detection filter pre-stored; and
   a step of determining the noise reduction coefficient from the relative position between the focus pixel and each reference pixel according to the detected edge direction.

4. The image processing method according to claim 3:
   wherein the method stores a distance table that indicates the relative position between a focus pixel and each reference pixel for every edge direction, and references a distance table for the appropriate detected edge direction to determine said relative position.

5. An image processing apparatus to create a compensated image by reducing noise in a captured image according to the difference in pixel values and relative position between a focus pixel and each of its surrounding reference pixels in the captured image, comprising:
   a means for storing edge detection filters;
   a means for storing a distance table that indicates the relative position between a focus pixel and each reference pixel for every edge direction;
   an image shrinking means for creating a shrunken image by smoothing pixel values for every block of a predetermined size in the source image where the source image is the target image to be filtered;
   an edge direction detection means for detecting the edge direction and strength of the focus pixel by using the edge detection filter;
   a position weight filter composite means for creating a position weight filter from the detected edge strength and the relative position determined by the distance table corresponding to the edge direction detected; and
   a pixel value calculation means for computing the pixel value in the shrunken image that correspond to the source image pixel by performing linear interpolation from the shrunken image pixels, and computing the compensated pixel value of the focus pixel in the source image according to the pixel values obtained by applying the position weight filter to a reference pixel of the source image and the pixel values obtained by applying the position weight filter to a pixel of a certain coordinate related to the focus pixel in the shrunk image.

* * * * *